June 5, 1951 G. T. RANDOL Re. 23,375
SPEED RESPONSIVE DEVICE
Original Filed Jan. 5, 1946 2 Sheets-Sheet 1
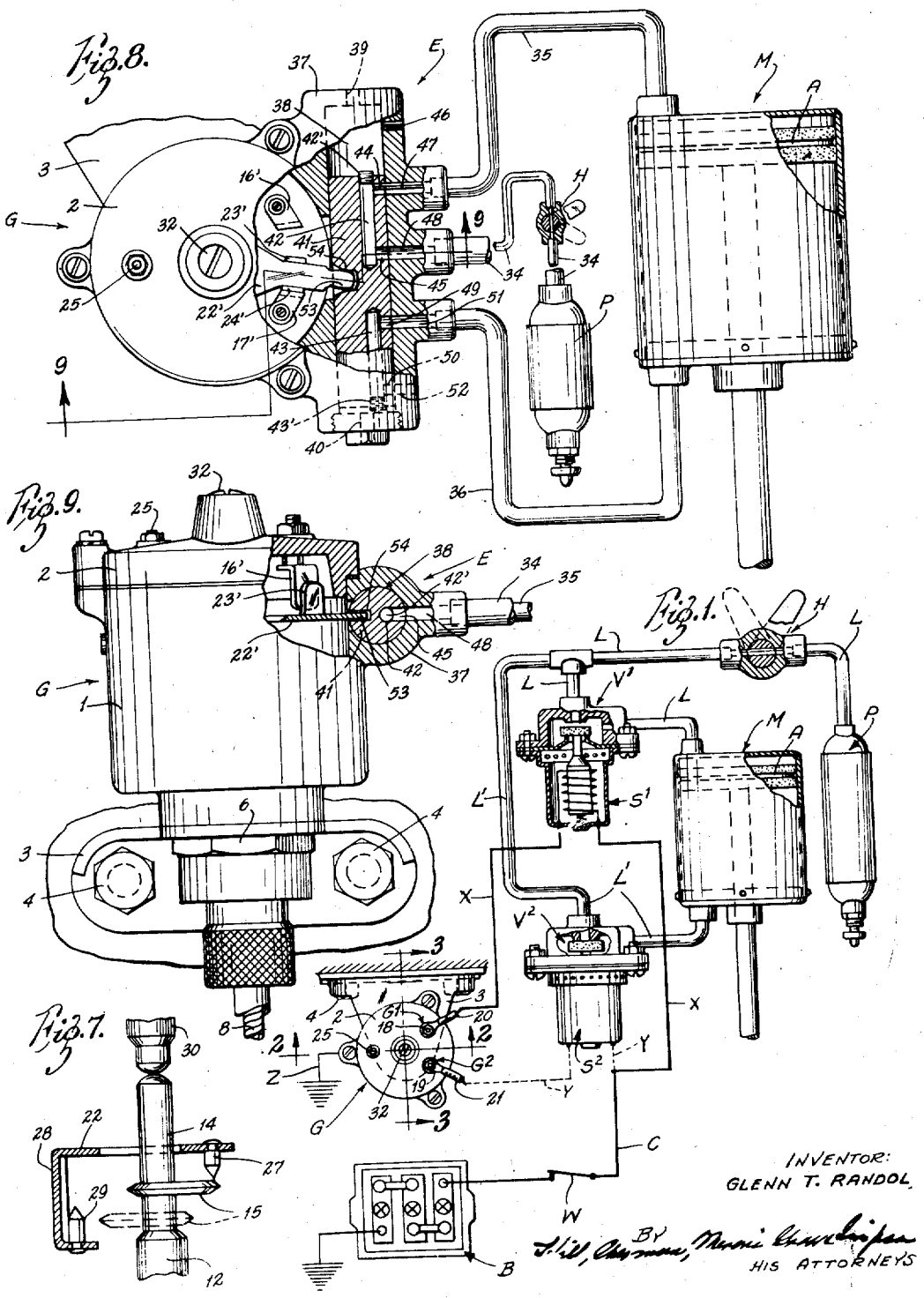
INVENTOR:
GLENN T. RANDOL,
BY Hill, Chamberlin, Morris & Chamberlin
HIS ATTORNEYS June 5, 1951 G. T. RANDOL Re. 23,375
SPEED RESPONSIVE DEVICE
Original Filed Jan. 5, 1946 2 Sheets-Sheet 2
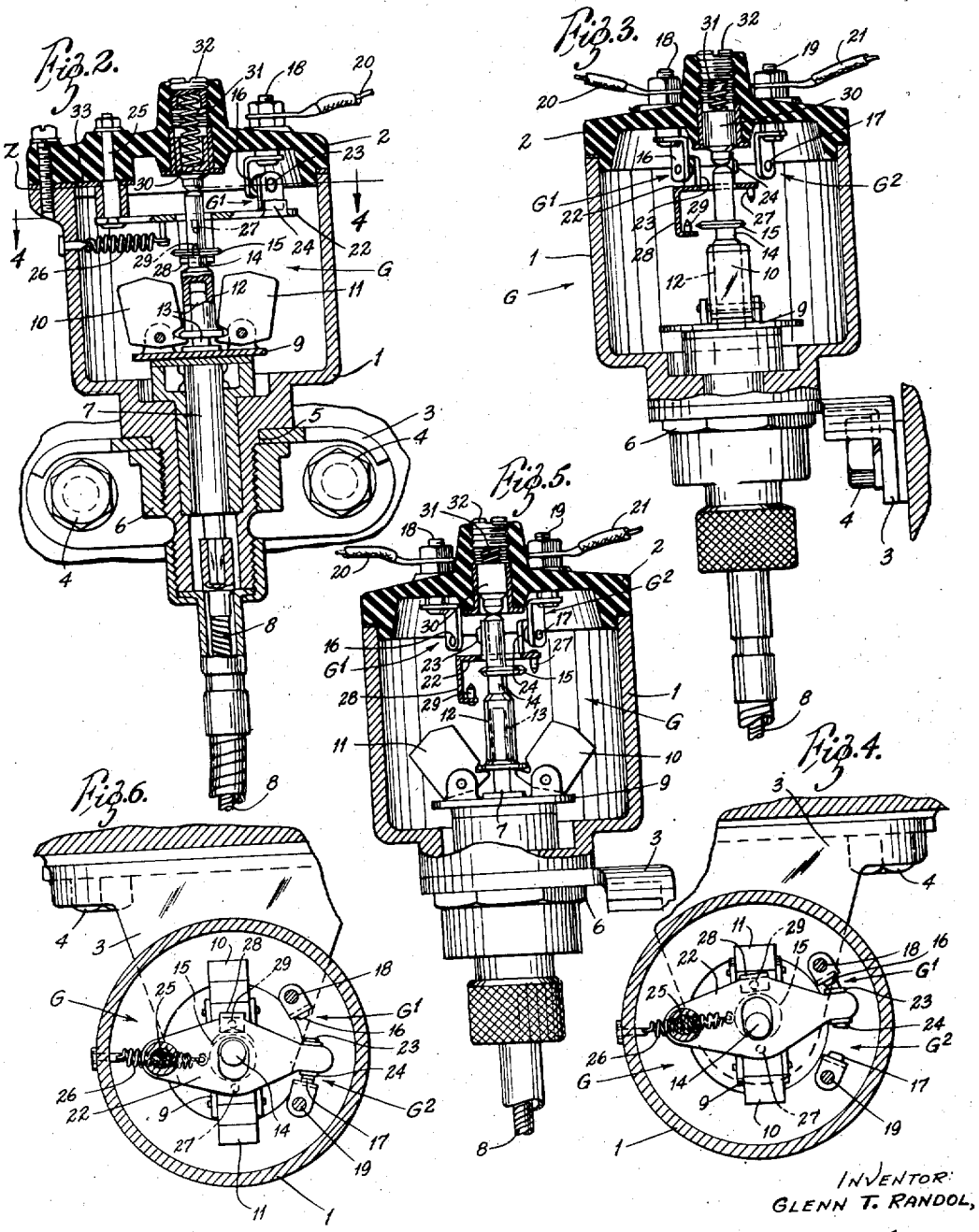
INVENTOR:
GLENN T. RANDOL,
BY Kill, Sherman, Merriam, Clark & Griffin
HIS ATTORNEYS Reissued June 5, 1951

Re. 23,375

UNITED STATES PATENT OFFICE 23,375

SPEED-RESPONSIVE DEVICE

Glenn T. Randol, Mountain Lake Park, Md., assignor of one-half to Elizabeth Leighton Randol, Mountain Lake Park, Md.

Original No. 2,534,733, dated December 19, 1950, Serial No. 639,184, January 5, 1946. Application for reissue March 23, 1951, Serial No. 217,112

18 Claims. (Cl. 74—25)

Matter enclosed in heavy brackets [ ] appears in the original patent but forms no part of this reissue specification; matter printed in italics indicates the additions made by reissue.

This invention relates to a speed-responsive device or governor, and more particularly to the controlling functions of such a device by positioning an element thereof in different operative positions.

One of the objects of my invention is to provide an improved speed-responsive device for actuating a control member from one operative position to another when the speed of a member thereof assumes a predetermined value.

Another object is to produce an improved speed responsive device having centrifuge members which are capable of causing limited positive moving of a control member from one operative position toward another when a predetermined speed is attained by its rotating member.

A further object related to that last stated is to associate with such a member an over-center spring means operable for completing the final movements of said member to either of its two different operative positions.

A still further object is to provide an improved speed-responsive means for controlling the moving of a control member from one operative position to another without "lag" when the speed of a member assumes a predetermined value.

Yet another object is to provide improved speed-responsive controlled means for moving a control element from one operative position to another when a predetermined speed is attained which will be free from "hunting" in the event the speed should vary within limits on each side of the predetermined value after the control element has been caused to assume its said other operative position.

A more specific object is to provide in a speed-responsive device rotatable cam means for directly initiating the movement of a control element between two positions and centrifuge members responsive to the speed of a member rotating a cam for determining toward which position said cam will move said control element.

Another specific object is to produce an improved speed-responsive device for controlling the movement of a switch element to two different contacting positions, and wherein said switches are capable of carrying heavy current loads for sustained periods and thus eliminate the necessity of using relay switches in the circuits controlled by said switch element.

Yet a further object is to produce a speed-responsive device which is sensitive in its settings and so designed as to be regulated by a single adjusting means to vary the predetermined speed at which it is capable of establishing different operative conditions.

A further object is to produce a speed-sensitive device having centrifuge members which is so designed that the centrifuge members are not required to overcome any resistance by the action of centrifugal force to obtain changed operating conditions.

A further object is to produce an improved speed-responsive device for controlling a predetermined movement of an element toward different positions which will embody centrifuge members movable to select said movement by variable speeds of a rotating member, and wherein said rotating member will produce all the torque force necessary to move the element aforesaid without any resistance opposing the free action of the centrifuge members by the centrifugal and centripetal forces acting thereon to select said movement.

A still further object is to produce a speed-responsive device which is simple in design, easy to manufacture at a low cost and applicable to a wide range of uses in control systems.

Other objects of my invention will become apparent from the following description taken in connection with the accompanying drawings in which:

Figure 1 is a schematic view of a control system having associated therewith as one of the control units, a speed-responsive device embodying my invention, and employed to move a switch element to two different operative positions to establish different control circuits, non-energized circuits being indicated by broken lines;

Figures 2 and 3 are different vertical sectional views of the speed-responsive device, said views being taken on the lines 2—2 and 3—3, respectively, of Figure 1;

Figure 4 is a horizontal sectional view showing the over-center spring actuated switch arm in its operative position of Figures 2 and 3, said sectional view being taken on the line 4—4 of Figure 2;

Figure 5 is a sectional view similar to Figure 3, but showing the parts in a different position resulting in the switch arm being moved to its other operative position;

Figure 6 is a sectional view similar to Figure 4, but showing the switch arm in the position assumed in Figure 5;

Figure 7 is an enlarged view, partly in section, showing detail construction of parts of the switch arm and the actuating cam, together with their relationship to accomplish the over-center spring actuation of the arm;

Figure 8 is a view showing the manner in which the speed-responsive device can be employed to directly control a valve element instead of a switch element; and Figure 9 is a sectional view taken on the line 9—9 of Figure 8.

Referring to the drawings in detail and first to Figures 1 to 7, inclusive, wherein my improved speed-responsive device is shown as being employed to control the closing of two switches in two independent electrical circuits. An example of the circuits to be controlled by the speed-responsive device is shown in Figure 1. In this figure my improved speed-responsive device or governor is indicated generally by the letter G and the two switches to be controlled are indicated by the letters $G^1$ and $G^2$. The switch $G^1$ forms part of a circuit X and the switch $G^2$ forms part of a circuit Y. Within the circuit X is a solenoid $S^1$ and within the circuit Y is a solenoid $S^2$, which solenoids will be energized whenever the circuits are closed. Both circuits are connected by a common conductor C which is connected to a source of current such as the grounded battery B. In order to complete the circuits by alternate closing of switches $G^1$ and $G^2$, the common closing element of the speed-responsive device G (to be later described) is connected to ground by a conductor Z. If desired, the common conductor C for the circuits may have a switch W for maintaining both circuits open.

In the system shown, by way of example, the solenoid $S^1$ is employed when energized to open a valve $V^1$ of a fluid pressure system and the solenoid $S^2$ when energized to open a valve $V^2$ of the fluid pressure system. This fluid pressure system comprises a source of fluid pressure *or vacuum* P and a double acting fluid pressure operated motor M having an actuating piston A.

The source of pressure is connected to one end of the fluid motor M through the valve $V^1$ by suitable piping L, as shown, and other piping L' is employed to connect the source of pressure with the other end of the fluid motor through the valve $V^2$. If desired, a hand controlled valve H can be embodied in the pipe L between the source of pressure P and the valves $V^1$ and $V^2$ and when this hand valve is closed it will be impossible to operate the fluid motor M notwithstanding that one or the other of the electrical circuits is energized due to the master switch W being closed.

When the solenoid $S^1$ is energized by the closing of the switch $G^1$ in the circuit X, the valve $V^1$ will be opened so as to connect the fluid motor M with the source of pressure, and if this source of pressure is less than atmospheric pressure as, for example, a vacuum source, the piston A will be moved to the [lower] *upper* end of the fluid motor *as illustrated in Figure 1*. During the opening of the valve $V^1$ the solenoid $S^2$ will be de-energized as the circuit Y (*shown in broken lines*) will be opened by the switch $G^2$. This de-energization of the solenoid $S^2$ will result in the valve $V^2$ being closed so as to disconnect the source of pressure from the [upper] *lower* end of the fluid motor, [but will permit] *and place* this [upper] *lower end* [to be connected to] *in communication with* the atmosphere by the particular valve structure shown. With the [upper] *lower* end of the fluid motor connected to atmosphere, the piston [will be free] *is freed* to move to the [lower] *upper* end of the fluid motor *as illustrated*. Whenever the circuit X is broken by opening of the switch $G^1$, the switch $G^2$ will be closed by the speed-responsive device G and consequently the solenoid $S^1$ will be de-energized and the solenoid $S^2$ energized. This will result in the [lower] *upper* end of the fluid motor being cut off from the source of pressure and connected with atmosphere by the particular valve $V^1$ and the [upper] *lower* end of the fluid motor connected to the source of pressure by the opening of the valve $V^2$ [which open position is shown in Figure 1.]. Consequently, the piston of the fluid motor will be moved to the [upper] *lower* end of the fluid motor [as shown], air under atmospheric pressure being free to enter the [lower] *upper* end of the fluid motor through the valve $V^1$. If the source of pressure should be super-atmospheric, then the valves would function in the same manner, but the piston *A* would move in the opposite directions according to the open positions of the valves. It is thus seen in the system shown in Figure 1 that the speed-responsive device or governor will control the operation of the fluid motor. Thus for speeds below a predetermined value, the piston of the fluid motor will be in one position [as] *at which* circuit X will be closed, and for speeds above a predetermined value, the piston will assume another position [as] *at which* circuit Y will be closed. The fluid motor can be employed to actuate any element desired.

The speed-responsive control means or governor G for controlling the switches $G^1$ and $G^2$, and embodying my invention, is shown in detail in Figures 2 to 7 and reference to these figures is now made. This speed-responsive device is of the two-stage type since it is controlling two switches in two circuits. The speed-responsive device will be referred to as a governor since it employs centrifuge members.

The governor has a cup-shaped case 1 provided with a cover 2 of suitable non-conducting material. The governor case carries a bracket 3 for attaching it to any suitable support by bolts 4. This bracket has a hole 5 through which projects an extending threaded part on the lower portion of the casing. This extending end is clamped to the bracket flange by a nut 6. Journaled in the casing is a shaft 7 which is driven by means of a flexible shaft 8 from any rotating member, the speed of which the governor is to be responsive, an example being a propeller shaft of a motor vehicle.

The shaft 7 of the governor is provided with a plate 9 on which is pivoted two centrifuge members 10 and 11. These two centrifuge members engage a sleeve 12 slidably mounted on a pin 13 extending from the shaft. The pin is square, as is the bore of the sleeve, so that the sleeve will rotate with shaft 7. The connection between the sleeve 12 and the centrifuge members is such that the sleeve will be moved upwardly whenever the centrifuge members fly outwardly, due to increasing speed of the shaft 7 which, of course, would be caused by increasing speed of the member driving the shaft. Sleeve 12 has a short portion 14 extending upwardly therefrom and integral with this short portion is an eccentric cam member 15 for controlling the two switches $G^1$ and $G^2$ of the governor.

The cover 2 carries the fixed contact element 16 of the switch $G^1$ and the fixed contact element 17 of the switch $G^2$. These contact elements have terminals 18 and 19, the terminal 18 having connected thereto the conductor 20 of circuit X of the system to be controlled and the terminal 19 having connected thereto the conductor 21 of the circuit Y. The cover of the governor also has pivoted thereon an electrically grounded arm 22 which forms the movable switch element by which the movable contact 23 of the switch $G^1$ and movable contact 24 of switch $G^2$ are controlled. The arm 22 is arranged to swing in a plane at right angles to the axis of the governor. Its pivot pin 25 carried by the cover is at one end of the arm and the other end of the arm lies between the fixed contacts 16 and 17 and carries the contacts 23 and 24. The arm 22 is arranged to be of the snap-over type and to accomplish this there is provided an over-center spring 26 connected at one end to an intermediate portion of the arm and at the other end to the casing and extending across the axis of the pivot pin 25 for the arm. The spring arrangement is such that it will be effective to perform the over-center closing movement of the contacts comprising switch $G^1$ with a "snap" action and hold them closed, or to likewise complete the closing of contacts comprising switch $G^2$ and, once such contacts are closed, to hold them closed until another switching change is inaugurated.

The moving of the arm 22 to either of the two switch closed positions is accomplished in two merging movements by means of the previously referred to eccentric cam 15 and over-center spring 26. To accomplish this the bottom of the arm carries a downwardly extending pin 27 on one side of the axis of the governor and on the opposite side a flange portion 28 from which extends upwardly a second pin 29. The pins 27 and 29 have conical ends and these ends are so axially spaced from each other that it is impossible for the eccentric cam to engage both pins simultaneously. Also the diameter of the cam 15 is less than the distance between the confronting sides of the pins contacted by the cam but having a rise sufficient to throw the arm 22 slightly past the axis of said cam in either direction of its movement when either of the switches $G^1$ or $G^2$ is closed solely by the action of the over-center spring 26. The associated pin will therefore, be out of the rotative path of the eccentric cam 15. The peripheral portion of the cam is formed with a preferred double beveled surface, as best shown in Figure 7, so as to *accommodate* [permit] smooth cooperation between it and the conical ends of the pins.

When the rotative speed of the driven shaft 7 is below a predetermined value the cam 15 will be in a position to engage pin 29 and consequently the arm 22 will be swung over-center so that the spring 26 can be effective to close the contacts of switch $G^1$ with a "snap" action, in which position the contacts will be held by the spring as shown in Figures 2, 3 and 4. Once these contacts are caused to be closed in the manner above described the pin 29 will be so positioned that it will no longer be able to be contacted by the cam 15 as it rotates with the shaft 7, all as shown in Figures 3 and 7. As the speed of the shaft 7 increases above the predetermined value the cam 15 will be moved selectively upwardly by the centrifuge member to a point above the upper end of the pin 29 and will then be in a position to engage the lower end of the pin 27. When this occurs the eccentric cam will swing the arm 22 so as to cause a breaking of the contacts of the switch $G^1$ and upon the cam moving arm over-center the spring 26 will effect the actual closing of the contacts of switch $G^2$ with a "snap" action and maintain them closed until switch $G^1$ is again closed. The closed position of switch $G^2$ is shown in Figures 5 and 6. When the switch $G^2$ is closed the pin 27 will be positioned sufficiently away from the eccentric cam that it cannot hit this pin as said cam continues to rotate. If the rotative speed of the shaft 7 should become less than a predetermined value, the cam will again cooperate with the pin 29 and open the contacts of switch $G^2$ slightly beyond the over-center position of arm 22 with respect to the axis of the cam 15, and thus [permit] *cause* the closing of the contacts of switch $G^1$ solely by the action of the over-center spring 26. The construction of this two-stage governor switch means insures a smooth and quick switch change-over action, since the centrifuge members need only operate the sleeve 12. The movement of the switch controlling arm requires none of the centrifugal force employed for moving the sleeve 12 axially as the switch moving force comes from the rotation of the sleeve and the action of the over-center spring 26. As a result considerable or all "hunting" is eliminated, and also the contact elements can be made sufficiently large to carry heavy current loads without the necessity of using relay switches in the electrical control circuits X and Y, particularly sustained energized control circuits.

The centrifuge members are arranged to act against a spring means, preferably carried by the cover 2, and to accomplish this the pin 14 so extends through an arcuate slot in the arm 22 that it can be engaged by a cover carried plunger 30, which plunger is acted upon by a spring 31, the tension of which may be adjusted by a screw-plug 32. The movable contacts 23 and 24 are arranged to be grounded and, as already mentioned, this is accomplished by the conductor Z and a copper strip 33 (Figure 2) which connects the pivot pin of the arm to the governor casing.

My improved speed-responsive device or governor can be employed for other purposes besides closing switches in different circuits. Another example of its use is disclosed in Figures 8 and 9. As shown in these views, the governor G is adapted for directly controlling a valve E to two different operative positions. This valve E, as shown in Figure 8, is part of a fluid pressure system having a double acting fluid motor M provided with a piston A and operable from a source of pressure *or vacuum* P in a manner similar to the system shown in Figure 1.

The source of pressure P is connected by a conduit 34 to the valve E. Between the valve E and one end of the fluid motor is a conduit 35 and between the valve E and the other end of the fluid motor is a conduit 36. The valve E is arranged to alternately connect the conduits 35 and 36 with the source of pressure through the conduit 34. The construction of the valve is such that when one end of the fluid motor is connected to the fluid source the other end will be connected to atmosphere. If desired, a hand controlled valve H can be embodied in the conduit 34 between the source of pressure and the valve E and when this hand valve is closed it will be impossible to operate the fluid motor M, regardless of the condition of the valve E.

The valve E comprises a casing 37 which is attached to the casing 1 of the governor G adjacent the top thereof. This casing is provided with a bore 38 having its axis at right angles to the axis of the governor. The ends of the bore 38 have air openings 39 and 40. Within the bore is a cylindrical slidable valve element 41 constructed to have separate passages 42 and 43 in opposite ends thereof. The passage 42 has ports 44 and 45 extending to the periphery of the valve element and its outer end closed by a suitable plug 42'. These ports 44 and 45 are arranged to selectively cooperate with ports 46, 47 and 48 in the casing of the valve. The port 46 is in communication with the atmosphere, the port 47 is in communication with the conduit 35 and the port 48 is in communication with the conduit 34. The other passage 43 in the valve element is provided with spaced ports 49 and 50 which extend to the periphery of the valve element and having its outer end closed by a suitable plug 43'. These ports are arranged to selectively cooperate with ports 51 and 52 and the previously mentioned port 48. Port 51 is connected to the conduit 36 and port 52 is connected to atmosphere. When the valve element is in the lowermost position, as shown in Figure 8, the ports will be so arranged that the conduits 34 *and 35* will be connected to the source of pressure and the conduit 36 will be connected to atmosphere.

When the valve element is moved to its upper position the ports will be so arranged that the conduit 34 will be connected to the conduit 36 and the conduit 35 will be connected to atmosphere. With this arrangement it is seen that if suction is used as a source of pressure the piston of the fluid motor can be caused to move from one end to the other in response to different settings of the valve element.

The valve element is arranged to be controlled by the condition of the governor and to accomplish this the governor is provided with an arm 22' which is of a construction similar to the previously mentioned arm 22 of the governor shown in Figures 2 to 7, insofar as control structure is concerned. This arm 22' has an extension 53 which is arranged to fit into a recess 54 in the valve element. The arm 22' is provided with upwardly extending flanges 23' and 24' which take the place of the movable contacts 23 and 24 of the switch arm 22 described in Figures 2 to 7 and in place of the fixed contacts of switches $G^1$ and $G^2$ of said previously described structure there is provided stops 16' and 17' carried by the cover 2 of the governor.

When the speed of the rotating shaft 7 of the governor is below a predetermined value the arm 22' will be swung by the cam 15 and over-center spring 26 in the same manner as the switch arm 22 to the position where the flange 23' engages the stop 16' where it will be held by the over-center spring. This will result in the valve element 41 being placed in its upper position and under such conditions the lower end of the fluid motor M will be connected to the source of pressure (suction), thus causing the piston A to move to the lower end of the cylinder of the fluid motor. When the speed of the driven shaft rises above the predetermined value the cam element 15 of the speed responsive device will cause the arm 22' to be actuated over-center slightly beyond the axis of the cam and then moved on to the position shown in Figure 8 by the over-center spring 26. Upon completion of the aforesaid movement of arm 22' and connected valve element 41' the spring 26 will be effective to hold said element in its moved operative position. When this position is assumed the flange 24' will engage the stop 17' and the valve element 41 will be in the position shown in Figure 8. Under such conditions the upper end of the fluid motor will be connected to the source of suction and the lower end of the fluid motor will be connected to the atmosphere The piston of the fluid motor will therefore be moved to the upper end of the fluid motor cylinder and assume the position shown in Figure 8. If the speed of the driven shaft should assume a value below the predetermined speed, the valve element will again be positioned to cause the piston of the fluid motor to be moved to the lower end of the fluid motor cylinder. If the source of pressure is super-atmospheric the piston A will assume opposite positions for the same positions of the valve element.

From the foregoing description of my improved speed-responsive device it is seen that it is simple in construction and positive in operation. The arrangement is such that the control of its movable element from one position to another position is quickly and positively made without any tendency of the contact vibrating in closed condition or "hunting" between different contacts. The actual forces employed in producing the change of the movable contact element from one position to another is directly derived from the torque of the rotating shaft 7 and the over-center action of spring 26. There will be no appreciable resistance to free movement of the centrifuge members, thus said members are at all times directly and sensitively responsive to the speed of the rotating shaft. It is also to be noted that the arrangement is such that the actuating cam has some free axial movement between the conical ends of the cooperating pins 27 and 29. Thus, if a pin should be engaged and the contact arm 22 swung from one position to another, it will be swung back in the event the cam should be moved slightly towards the other pin. This is an important feature since it eliminates substantially all "hunting" of the movable contact element between its closed contact positions.

Once the contact arm 22 or 22' is set in a contact operative (closed) position, it will remain fixed in such position until its other operating position is assumed *or* [and] vice versa. In place of the arm 22 or 22' having two operative contact positions (closed), either of such positions may be an inoperative position (open) in its controlling function.

In the structure shown, the pins 27 and 29 have tapered ends and the cam 15 is provided with a double beveled surface. This is a preferred construction as it *provides* [permits] smooth cooperation, but is not essential. If desired, the tapered ends on the pins and the double beveled surface could be eliminated without affecting the operation of the governor. If the cam should engage a pin and offer resistance to free movement of the centrifuge members by centrifugal or centripetal forces, *such condition would* [it will] be only momentary. *Due to* [Because of] the eccentric mounting of the cam, [it will be unable to] contact *with* a pin *cannot occur* during approximately eighty percent of any single rotation *thereof*.

Being aware of the possibility of modifications in the particular structure shown and described without departing from the fundamental principles of my invention, I do not intend that its scope be limited in any manner except in accordance with the appended claims.

What is claimed is:

1. In a speed-responsive device, a rotating shaft, a member to be controlled, means for *initiating movement of* [actuating] said member toward two positions by a direct turning movement of the shaft and comprising a second member slidable on an axis coinciding with that of the shaft, *biasing means rendered active for initiation of movement of said first member for completing movement thereof to said two posi-*

*tions*, and movable means responsive to the speed of rotation of the shaft for moving said second member axially to cause the controlled member to be selectively actuated as aforesaid, said second member and the movable means being so associated with each other *and with said biasing means* that the [actuation] *completion of movement* of the controlled member [will] *does* not resist free movement of the movable means in response to the speed of rotation of the shaft.

2. In a speed-responsive device, a rotating shaft, a member to be controlled, cam means rotatable by the shaft and slidable on an axis coinciding with that of the shaft, said cam means having a portion eccentric to the shaft for *selectively* actuating said member toward two positions by the turning movement of the shaft, and means responsive to the speed of rotation of the shaft for sliding the cam means to cause the controlled member to be directly actuated by the turning of the eccentric portion of the cam means as it is rotated by the shaft.

3. In a speed-responsive device, a rotating shaft, a member to be controlled, eccentric cam means rotatable with the shaft and slidable bodily on an axis coinciding with the shaft axis for *selectively* actuating said member toward two positions by a turning movement of the cam means as it is rotated by the shaft, and means responsive to the speed of rotation of the shaft for selectively determining toward which position the controlled member will be actuated by the eccentric cam means, said last-named means comprising a member slidable on the shaft and centrifuge members positioned outwardly of the slidable member and operatively connected therewith and to the shaft.

4. In a speed-responsive device, a member movable to two positions, means for biasing the member in each position, a driven rotatable member, said movable member being movable in a plane at right angles to the axis of the rotatable member and having parts on opposite sides of said axis, a member slidable axially with respect to said rotatable member, means for moving the axially movable member to different positions in response to the speed of the driven rotatable member, and cam means directly rotatable by the rotation of the driven rotatable member and controlled by the axial position of the axially slidable member for selectively engaging the parts of the first-named member which are on opposite sides of the axis of the rotatable member and moving the first-named member from one of its positions toward the other by rotative movement only of the cam means.

5. In a speed-responsive device, a pivoted arm movable to two positions, a rotatable shaft, slidable eccentric cam means rotatable by the shaft and having different positions for moving the pivoted arm selectively toward the two positions by the rotation of the cam, centrifuge members controlled by the speed of the rotatable shaft for slidably moving the cam means to its different positions, and means for changing the speed conditions at which the cam means moves the arm comprising a single spring acting at one end on the cam means and an adjustable abutment for the other end of the spring.

6. In a speed-responsive device, a pivoted arm movable to two positions, an over-center spring means for biasing the arm to its two positions, a rotating shaft having its axis at right angles to the plane of movement of the arm, axially spaced projections on the arm positioned on diametrically opposite sides of the shaft axis, an eccentric cam mounted for axial movement on the shaft and rotatable by the shaft, means for selectively moving the arm toward its two positions by the rotation of the cam when it is moved axially to predetermined positions and comprising axially spaced projections on the arm positioned on diametrically opposite sides of the shaft axis and selectively engageable by the cam, and means responsive to the speed of rotation of the shaft for moving the cam axially.

7. In a speed-responsive device, a pivoted arm movable in a single plane to two positions, an over-center spring means for biasing the arm to its two positions, a rotating shaft having its axis at right angles to the plane of movement of the arm, an eccentric cam mounted for axial sliding movement bodily on the shaft and rotatable by the shaft, means including projections on the arm positioned on opposite sides of the shaft axis for moving the arm from either position toward the other position by the rotation of the cam, the direction of movement being determined by the axial position of the cam, centrifuge members movable in response to the speed of rotation of the shaft, and means for moving the cam axially by the centrifuge members.

8. In a speed-responsive device; a shaft connected to be rotated at varying speeds; an eccentric cam axially slidable on said shaft and rotatable therewith; centrifuge members rotated by said shaft and *operably* connected to move said cam to different axial positions in response to varying speeds of said shaft; an arm pivoted to oscillate selectively across the axis of said shaft toward two different positions in a plane substantially at right angles to the axis of said shaft, means for biasing said arm to either of its positions; and means carried by said arm on opposite sides of said shaft axis and engageable by said cam for directly moving said arm across the axis of said shaft from one position toward the other position, said last-named means and cam being so related that when said cam is moved axially in one direction past a predetermined point it will engage one of said arm means to thus directly rotate said arm past the axis of said shaft toward one of said positions, and when moved axially in the opposite direction past a predetermined point said cam will engage the other of said arm means and thus rotate said arm in an opposite direction past the axis of said shaft toward the other of said positions.

9. In a speed-responsive device; a shaft connected to be rotated at varying speeds; an eccentric cam axially slidable on said shaft and rotatable therewith; means responsive to rotation of said shaft and operatively connected to said cam for axially moving said cam to different axial positions in response to varying speeds of said shaft; an oscillatable arm pivoted on an axis parallel to said shaft axis and movable to a single position on opposite sides of a line passing through both of the aforesaid axes; an over-center action spring associated with said arm for completing the movement thereof to either of said positions after said arm has been moved beyond said line; means carried by said arm and positioned on opposite sides of the axis of said shaft, said means being axially spaced apart and so associated with said cam that with said arm in one position, it will be moved beyond said line toward its other position directly by rotation of said cam when said cam has been axially positioned in one direction past a predetermined point, and with said arm in its other position it will be moved beyond said line toward said one position directly by rotation of said cam when axially positioned in the opposite direction past said predetermined point.

10. In a speed-responsive device, a rotating shaft, a member to be controlled and capable of movement to two operative positions, eccentric cam means selectively slidable on said shaft and operable for directly imparting an initial movement to said member to move it from either position toward the other, spring means operatively associated with said member for imparting final movement to said member in assuming either of said positions, and means responsive to the speed of rotation only of said shaft for predetermining toward which position said member will be initially moved directly by said cam means when selectively operated as aforesaid.

11. In a speed-responsive device, a rotating shaft, a pivoted arm oscillatable in a plane substantially at right angles to the axis of said shaft and across said axis to assume two different positions, over-center action spring means acting on said arm to cause it to assume either of its two positions after it has been initially moved across said shaft axis from one of said positions, means for initially moving said arm directly by a turning movement only of said shaft including rotating cam means having an axis parallel with the pivotal axis of said arm, and means responsive to the speed of rotation of said shaft for selectively determining toward which position said arm will be initially moved by said rotating cam when rotated.

12. A speed-responsive device comprising a rotary member capable of being rotated at different speeds, a plurality of centrifuge members pivotally attached to said rotary member at diametrically opposite points for movement between inner and outer positions, said members being individually operative substantially in unison and being biased to their inner positions by a single spring means; a rocker arm movable between two extreme positions on opposite sides of and at right angles to the axis of said rotary member; eccentric cam means mounted for selective axial sliding movement with respect to said rotary member and rocker, and operatively connected to said members; means responsive to the movements of said members when rotated at different speeds for sliding said cam means selectively to engaging positions with said rocker; and means operable to initiate movement of said rocker from either of its extreme positions toward the other by direct engagement of said cam means with said rocker in response to rotation only of said rotary member.

13. In a speed-responsive device, a rotatable shaft, a pivoted arm for swinging movement in a plane at right angles to the axis of the shaft, pins carried by the arm and arranged to be on opposite sides of the shaft axis, said pins extending axially in opposite directions with the ends thereof being conical and the apexes thereof in axially spaced relation, a slidable eccentric cam rotatable by the shaft and provided with a peripheral edge of V-shaped cross-section for cooperation with the conical ends of the pins to move the arm by rotation of the cam, and means responsive to the speed of rotation of the shaft for moving the cam axially.

14. In a speed-responsive device, a rotatable shaft, a member axially slidable on [the end of] the shaft and rotatable [with the shaft] *therewith*, an eccentric cam carried by the axially slidable member, centrifuge members rotatable by the shaft and *operably* connected to move the slidable member axially, a member to be controlled and being mounted for *selective* movement to two positions, and means carried by the member for cooperation with the cam when in different axial positions [to thereby permit the] *whereby said* cam by its rotation [to move] *selectively moves* the member to be controlled to its two different positions.

15. In a speed-responsive device comprising a centrifuge member pivoted to a rotary member fixed on a drive shaft for oscillation between outer and inner positions in a plane disposed substantially at right angles to the plane of rotation of said member, and biased to its inner position by spring means: an eccentric cam axially slidable on and rotatable with said drive shaft, said cam being operatively connected to said centrifuge member for movement selectively thereby to different axial positions in response to varying speeds of said shaft; a pivoted oscillatory arm movable across the axis of said cam in a plane substantially parallel to its plane of rotation to two operative positions, said arm having axially spaced projections positioned on opposite sides of said cam in parallel relation to its axis; and means operable for moving said arm toward either of its positions by direct selective engagement of said cam with said projections in response to the rotary movement and varying speeds of said rotary member.

16. In a speed-responsive device comprising a centrifuge member pivoted to a rotary member fixed on a drive shaft for oscillation between outer and inner positions in a plane disposed substantially at right angles to the plane of rotation of said member, and biased to its inner position by spring means: an eccentric cam axially slidable on and rotatable with said drive shaft, said cam being operatively connected to said centrifuge member for movement selectively thereby to different axial positions in response to varying speeds of said shaft; a pivoted oscillatory arm movable across the axis of said cam in a plane substantially parallel to its plane of rotation to two operative positions, said arm having axially spaced projections positioned on opposite sides of said cam in parallel relation to its axis and being biased to its positions by over-center action spring means; and means responsive to the rotation and varying speeds of said rotary member for causing said cam to initiate movement of said movable arm toward either of its positions by direct selective engagement with said projections whereby said over-center spring means is rendered effective to complete the movement of said arm to the selected operative position.

17. A speed-responsive device comprising a rotary member capable of being rotated at different speeds, a plurality of centrifuge members pivotally attached to said rotary member at diametrically opposite points for movement between inner and outer positions, said members being individually operative substantially in unison and being biased to their inner positions by a single spring means; a rocker arm movable between two extreme positions on opposite sides of and at right angles to the axis of said rotary member, said rocker having operatively associated therewith over-center action spring means; eccentric cam means mounted for selective axial sliding movement with respect to said rotary member and rocker, and operatively connected to said members; means responsive to the movements of said members when rotated at different speeds for sliding said cam means selectively to engaging positions with said rocker; means operable to initiate movement of said rocker from either of its extreme positions toward the other by direct engagement of said cam means with said rocker in response to rotation only of said rotary member; and means for rendering effective said over-center spring means to complete the movement of said rocker to either of its selected extreme positions.

18. In a speed-responsive device, a rotary shaft, a member to be controlled, means comprising a rotating cam rotated by the shaft for selectively actuating the member toward two positions by the turning movement of the cam, means comprising a centrifuge member movable by the speed of the rotating shaft for determining toward which position the actuating means will move the member to be controlled, and adjustable means for varying the determining condition comprising a single spring separate from the centrifugal member and acting on the actuating means, and an adjustable member for varying the tension of the spring.

GLENN T. RANDOL.

REFERENCES CITED

The following references are of record in the file of this patent or the original patent:

UNITED STATES PATENTS

| Number | Name | Date |
|---|---|---|
| 625,363 | Smith | May 23, 1899 |
| 660,047 | Conklin | Oct. 16, 1900 |
| 791,694 | Hudson | June 6, 1905 |
| 1,370,749 | Kimble | Mar. 8, 1921 |
| 1,401,587 | Cornwall | Dec. 27, 1921 |
| 1,419,626 | Hardin | June 13, 1922 |
| 1,680,944 | Hoglund | Aug. 14, 1928 |
| 2,083,343 | Naul | June 8, 1937 |
| 2,164,667 | Sinnett | July 4, 1939 |
| 2,338,859 | Livingston | Jan. 11, 1944 |

FOREIGN PATENTS

| Number | Country | Date |
|---|---|---|
| 188 | Great Britain | Jan. 24, 1861 |